(12) United States Patent
Balupari

(10) Patent No.: US 10,812,353 B2
(45) Date of Patent: Oct. 20, 2020

(54) AGGREGATE NETWORK TRAFFIC MONITORING

(71) Applicant: Netskope, Inc., Los Altos, CA (US)

(72) Inventor: Ravindra K. Balupari, San Jose, CA (US)

(73) Assignee: Netskope, Inc., Santa Clara, CA (US)

(*) Notice: Subject to any disclaimer, the term of this patent is extended or adjusted under 35 U.S.C. 154(b) by 251 days.

(21) Appl. No.: 16/016,430

(22) Filed: Jun. 22, 2018

(65) Prior Publication Data

US 2018/0375745 A1     Dec. 27, 2018

Related U.S. Application Data

(60) Provisional application No. 62/524,979, filed on Jun. 26, 2017.

(51) Int. Cl.
*H04L 12/26* (2006.01)
*H04L 29/08* (2006.01)

(52) U.S. Cl.
CPC ........ *H04L 43/062* (2013.01); *H04L 43/0876* (2013.01); *H04L 67/146* (2013.01)

(58) Field of Classification Search
CPC .. H04L 43/062; H04L 43/0876; H04L 67/146
USPC ........................................................ 709/224
See application file for complete search history.

(56) References Cited

U.S. PATENT DOCUMENTS

| | | | | |
|---|---|---|---|---|
| 9,351,193 | B2* | 5/2016 | Raleigh | G06Q 40/12 |
| 9,426,049 | B1* | 8/2016 | Kalavade | H04L 43/0876 |
| 2009/0240568 | A1* | 9/2009 | Ramer | G06Q 30/0251 |
| | | | | 705/14.49 |
| 2011/0246646 | A1* | 10/2011 | Nakhjiri | H04L 63/0823 |
| | | | | 709/224 |
| 2016/0112475 | A1* | 4/2016 | Lawson | H04L 67/2823 |
| | | | | 709/204 |
| 2018/0139214 | A1* | 5/2018 | Anderson | H04L 63/0428 |
| 2018/0262347 | A1* | 9/2018 | Levy | H04L 9/3268 |

* cited by examiner

*Primary Examiner* — Tonia L Dollinger
*Assistant Examiner* — Jonathan A Sparks
(74) *Attorney, Agent, or Firm* — Haynes Beffel & Wolfeld, LLP; Ernest J. Beffel, Jr.; Sikander Khan

(57) ABSTRACT

The technology disclosed automates aggregate network traffic monitoring using an aggregation index that maps URLs, domain names, and subdomain names to roll-up families. Network usage records for family members, i.e., URLs, domain names, and subdomain names mapped to the same roll-up family in the aggregation index, are rolled up and attributed to a family root name identifying the roll-up family.

20 Claims, 14 Drawing Sheets

```
<app name="googledoc" id="102">
<id>
<match op="regex" field-name="http_host" val="docs.google.com"/>
</id>
<resource-paths>
<basepath>
<host rootdomain="docs.google.com" />
<url prefix="/a/{u_corpname}" prefixtype="optional" rooturl="/" />
</basepath>
<resource path="document/d/{gdocid}/" adminpolicy="" displayname="Document" />
<resource path="drawing/d/{gdocid}/" adminpolicy="yes" displayname="Drawing" />
<resource path="file/d/{gdocid}/" adminpolicy="yes" displayname="Uploaded File" />
<resource path="presentation/d/{gdocid}/" adminpolicy="yes" displayname="Presentation" />
</resource-paths>
<vars>
<var name="gdocid" type="conn" vtype="string" meta="random-alphanum" />
</vars>
</app>
```

FIG. 3

```xml
<app name="dropbox" id="101">
  <id>
    <match op="regex" field-name="http_host" val="*.dropbox.com"/>
  </id>
  <resource-paths>
    <basepath>
      <host rootdomain="dropbox.com" />
    </basepath>
  </resource-paths>
  <vars>
    <var name="logine" type="conn" vtype="string" meta="email" />
  </vars>
  <triggers>
    <trigger name="login-successful" adminpolicy="yes" displayname="Dropbox Login Successful." />
    <trigger name="login-failed" adminpolicy="yes" displayname="Dropbox Login Failed." />
  </trigger>
  <resource path="/login">
    <request>
      <method type="POST" >
        <data type="kvps"/>
        <extract field-name="http_post_data" key="login_email" target-var="logine" />
      </method>
    </request>
    <response>
      <trigger>
        <condition>
          <or>
            <match op="eq" field-name="http_status" val="200"/>
            <match op="eq" field-name="http_status" val="302"/>
          </or>
        </condition>
        <find-and-update-user key="login_email" val="{logine}"/>
        <raise name="login-successful"/>
      </trigger>
      <trigger >
        <condition>
          <and>
            <match op="neq" field-name="http_status" val="200"/>
            <match op="neq" field-name="http_status" val="302"/>
          </and>
        </condition>
        <raise name="login-failed"/>
      </trigger>
    </response>
  </resource>
</app>
```

FIG. 4

| Family Root Name (roll-up family) | Domain Name | Family Members |
|---|---|---|
| youtube | youtube.com | www.youtube.com, *.au.youtube.com, *.in.youtube.com, *.uk.youtube.com, *.yt.be, youtu.be, *.i.ytmg.com |
| salesforce | salesforce.com | www.salesforce.com, *.chatter.com, *.force.com, *.site.com, *.einstein.com, *.origin-c.salesforce.com |
| datamotion | datamotion.com | www.datamotion.com, *.datamotion.com, *.sucuri.net |
| channelmanagement | channelmanagement.com | www.channelmanagement.com, *.channelmanagement.com |
| cubby | cubby.com | www.cubby.com, cubbyusercontent.com, ws.cubby.com, webdav.cubby.com, www.cubbyusercontent.com, ws.cubbyusercontent.com, cubby.com |
| cynapse | cynapse.com | www.cynapse.com, *.wpengine.com |
| confirmit | confirmit.com | www.confirmit.com, *.confirmit.com, www.confirmit.de, *.confirmit.de, www.confirmit.ru, *.confirmit.ru, extranet.confirmit.com |
| cloudassurance | cloudassurance.com | www.cloudassurance.com, *.cloudassurance.com |

FIG. 6A

210 youtube (6.7 Mbits/s) — 621

- www.youtube.com (2.5 Mbits/s)
- *.au.youtube.com (0.7 Mbits/s)
- *.in.youtube.com (1.2 Mbits/s)
- *.uk.youtube.com (1.6 Mbits/s)
- *.yt.be, youtu.be (0.5 Mbits/s)
- *.i.ytimg.com (0.2 Mbits/s)

salesforce (3.3 Mbits/s) — 623

- www.salesforce.com (1.4 Mbits/s)
- *.chatter.com (0.7 Mbits/s)
- *.force.com (0.5 Mbits/s)
- *.site.com (0.2 Mbits/s)
- *.einstein.com — 625 (0.4 Mbits/s)
- *.origin-c.salesforce.com (0.1 Mbits/s)

FIG. 6B

AGGREGATE NETWORK TRAFFIC MONITORING

PRIORITY DATA

This application claims the benefit of U.S. Provisional Patent Application No. 62/524,979, entitled, "AGGREGATE NETWORK TRAFFIC MONITORING", filed on Jun. 26, 2017. The provisional application is incorporated by reference for all purposes.

CROSS-REFERENCE TO OTHER APPLICATIONS

This application is related to U.S. Nonprovisional patent application Ser. No. 14/198,499, entitled "SECURITY FOR NETWORK DELIVERED SERVICES", filed on Mar. 5, 2014 (now U.S. Pat. No. 9,398,102 issued on Jul. 19, 2016), which is incorporated by reference for all purposes;

This application is related to U.S. Nonprovisional patent application Ser. No. 14/835,640, entitled "SYSTEMS AND METHODS OF MONITORING AND CONTROLLING ENTERPRISE INFORMATION STORED ON A CLOUD COMPUTING SERVICE (CCS)", filed on Aug. 25, 2015, which is incorporated by reference for all purposes;

This application is related to U.S. Nonprovisional patent application Ser. No. 15/368,240, entitled "SYSTEMS AND METHODS OF ENFORCING MULTI-PART POLICIES ON DATA-DEFICIENT TRANSACTIONS OF CLOUD COMPUTING SERVICES", filed on Dec. 2, 2016, which is incorporated by reference for all purposes; and This application is related to U.S. Provisional Patent Application No. 62/488,703, entitled "REDUCING LATENCY AND ERROR IN SECURITY ENFORCEMENT BY A NETWORK SECURITY SYSTEM (NSS)", filed on Apr. 21, 2017 which is incorporated by reference for all purposes.

FIELD OF THE TECHNOLOGY DISCLOSED

The technology disclosed relates to aggregate network traffic monitoring by a network security system, and in particular, relates to using an aggregation index to automatically aggregate network usage records for varying unified resource locators (URLs) that represent a common source.

BACKGROUND

A challenge with network traffic management is that huge number of applications and web sites make it very difficult to get a clear understanding of network traffic statistics. Of particular note are so-called common sources. A common source is an application or web site that can be accessed by different unified resource locators (URLs). Both recognizably similar URLs and much different URLs that represent a common source complicate aggregation of data volume statistics such as bandwidth. This occurs because there lacks an overt basis for correlating network usage records for varying URLs of a common source.

Therefore, an opportunity arises to automatically aggregate network usage records for varying URLs of a common source. Improved network traffic statistic aggregation may result.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIGS. 3-4 are examples of application definitions used by the network security system for deep application programming interface inspection (DAPII).

FIG. 6A shows one implementation of an aggregation index with roll-up families and family members.

FIG. 6B depicts one implementation of labelling data volume statistics for aggregation by attribution and family roll-up in the aggregation index.

DETAILED DESCRIPTION

Introduction

Figure 1:
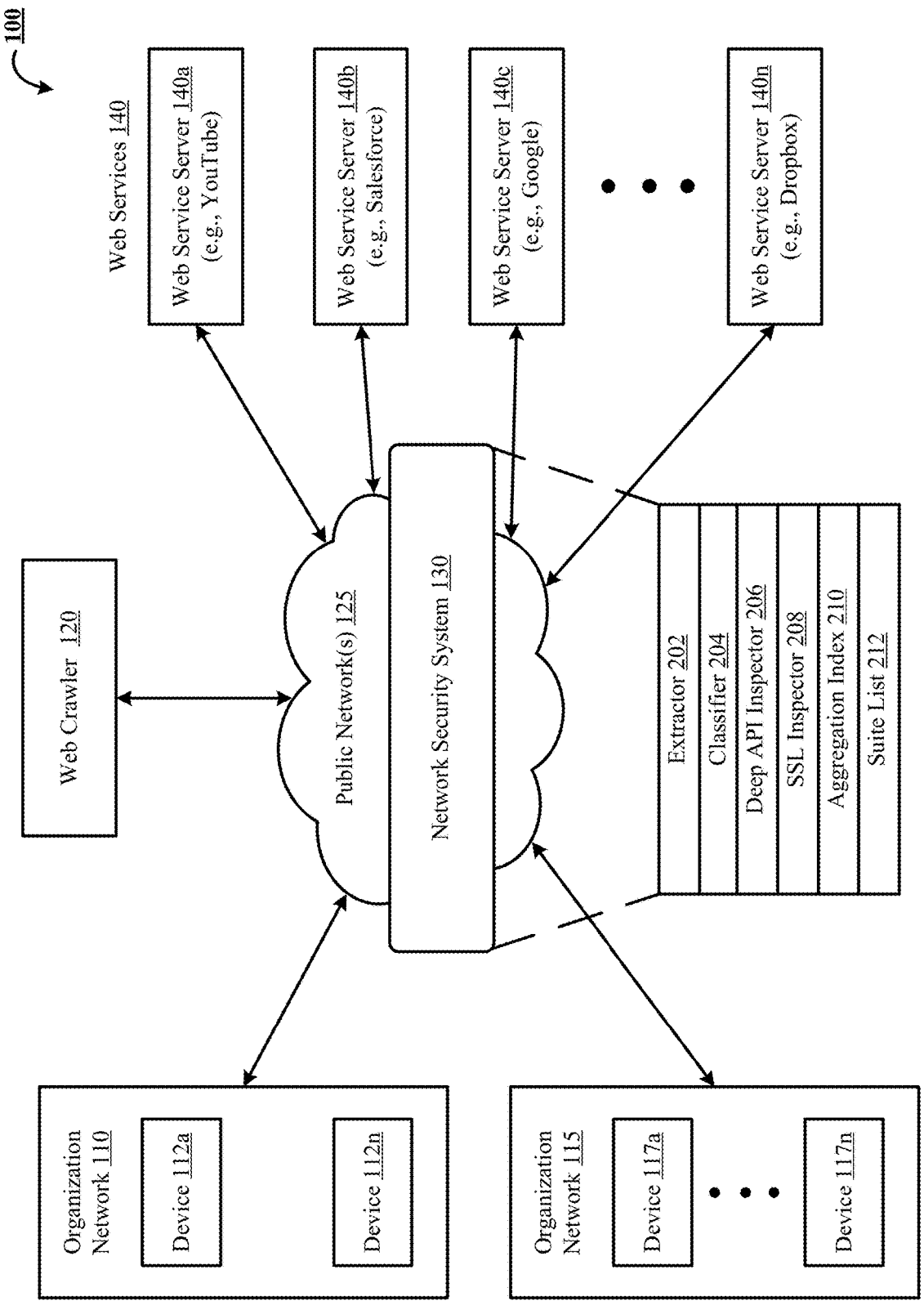
FIG. 1 illustrates an architectural level schematic of a system in which a network security system automates aggregate network traffic monitoring.
Figure 2:
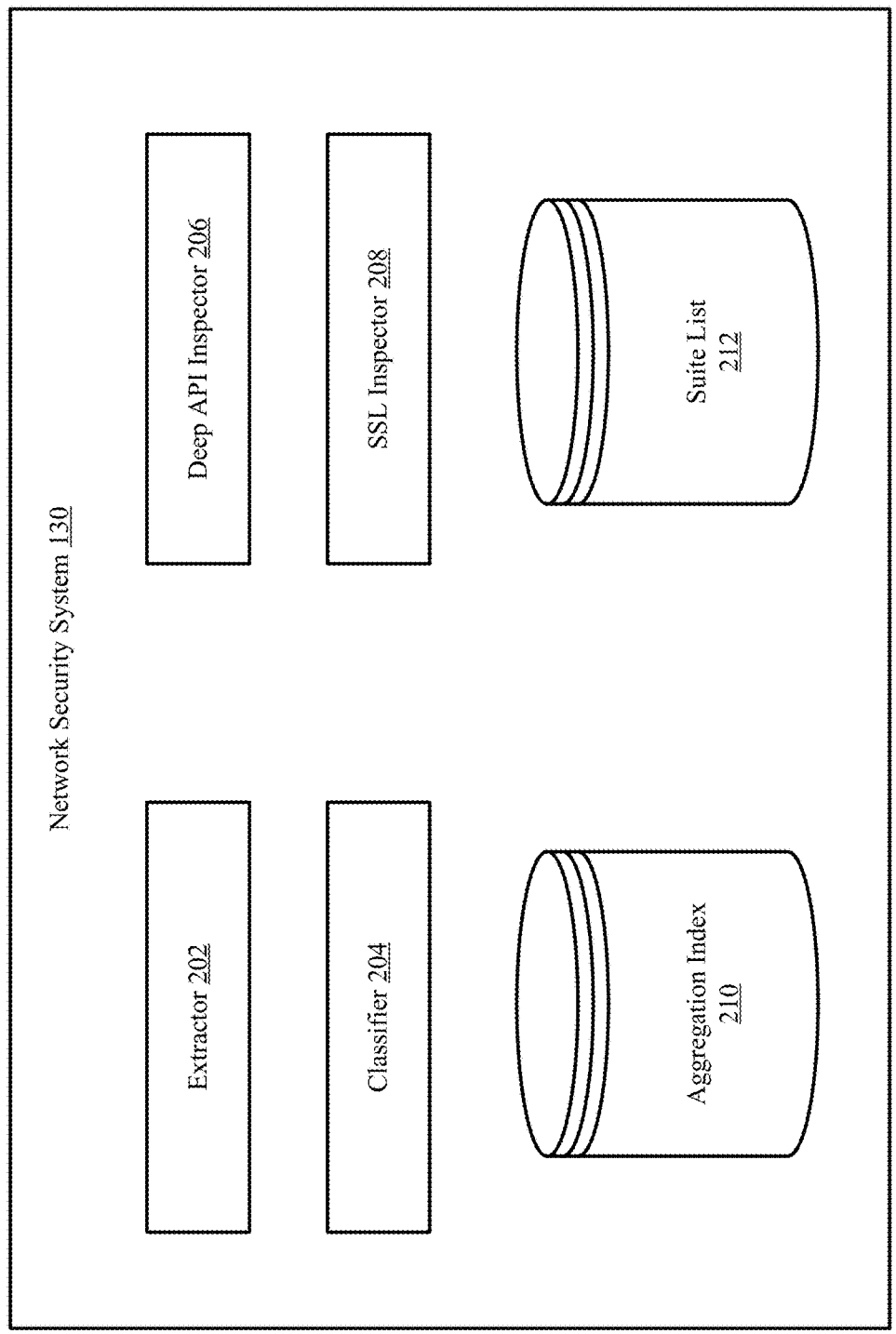
FIG. 2 is a block diagram of example modules of the network security system.

Both recognizably similar unified resource locators (URLs) and much different URLs can represent a common source, i.e., a family of addresses from which related content is available. Examples of recognizably similar URLs are "au.youtube.com", "in.youtube.com", and "uk.youtube.com". Depending on the country from which these URLs originate, the landing page may vary, but the content is related to the common source—YouTube™. Examples of much different URLs that can represent a common source, YouTube™, are "yt.be" and "youtu.be".

Variations in names that represent a common source complicate aggregation of bandwidth and other useful statistics by the system and organization controls (SOC) of an organization. This occurs because there lacks an overt basis for correlating network usage records for varying URLs of a common source.

We refer to a common source as a roll-up family, meaning that URLs, domain names, and subdomain names which represent a common source are rolled up by family. The technology disclosed automates aggregate network traffic monitoring using an aggregation index that maps URLs, domain names, and subdomain names to roll-up families. Network usage records for family members, i.e., URLs, domain names, and subdomain names mapped to the same roll-up family in the aggregation index, are rolled up and attributed to a family root name identifying the roll-up family.

To build and/or update the aggregation index, the technology disclosed uses a combination of certificate inspection by a network security system and certificate mining by a web crawler. The network security system is interposed between a device receiving a URL and a web server specified by the URL. In one implementation, the communication protocol between the device and the web server is HTTPS (HTTP Secure) which is an adaptation of the Hypertext Transfer Protocol (HTTP). In HTTPS, the communication protocol is encrypted by Transport Layer Security (TLS), or formerly, its predecessor, Secure Sockets Layer (SSL). In such an implementation, the network security system intercepts the URL and automatically inspects the accompanying certificate for subject alternative names (SANs). The network security system then extracts URL, SAN components, and/or server name indication (SNI) from the URL and the SANs (e.g., using a domain extraction library such as tldextract), and looks up the extracted URL, the SAN components, and/or the SNI in the aggregation index. The URL and SAN components can be domain names, subdomain names, or host names (e.g., site, IP address, common name, registered name, etc.). If the look up returns a match with an existing roll-up family, the network security system then stores the URL, the URL components, the SANs, and/or the SAN components as new family members of the existing roll-up family.

In another implementation, the communication protocol between the device receiving the URL and the web server specified by the URL is HTTP. In the HTTP protocol, the traffic between the device and server is not encrypted. In such an implementation, the network security system directly extracts the URL components in the intercepted URL and looks up the extracted URL components in the aggregation index.

If the look up does not return a match, the network security system then creates a new roll-up family, using a common designator among the URL and SANs as the family root name, and the URL, the URL components, the SANs, and/or the SAN components as starting family members. In some implementations, the common designator is identified by calculating a term frequency-inverse document frequency (tf-idf) statistic over a URL and its SANs. In other implementations, it is the subject name or domain name of the URL.

The web crawler systematically and periodically browses the worldwide web to mine SAN certificates of most visited websites (identified by a ranking service like Quantcast™). The URLs, SANs, and SNIs linked to the SAN certificates and their extracted components are then used to either update existing roll-up families or create new roll-up families in the aggregation index, with the URLs, the URL components, the SANs, and/or the SAN components added as new family members or starting family members. As discussed above, the SANs linked to the SAN certificates are used when the communication protocol between the device and the server is HTTPS.

When the network security system receives a URL, it compares at least one substring of the URL to entries in the aggregation index and classifies the URL as either attributed or unattributed. If the URL or a substring or component of the URL is previously attributed as a family member of an existing roll-up family, the network security system attributes network usage records for the URL to the existing roll-up family.

If the URL is unattributed and not found in the aggregation index, the network security system automatically inspects a certificate accompanied with the URL for subject alternative names (SANs). The network security system then compares substrings of the SANs to entries in the aggregation index. If at least one SAN or a substring or component of the SAN is previously attributed as a family member of an existing roll-up family, the URL is treated as an attributed URL. The network security system then updates the aggregation index and correlates the URL and/or its components to the existing roll-up family to prevent future misclassification.

If both the URL and the SANs are unattributed and not found in the aggregation index, the network security system creates a new roll-up family in the aggregation index based on the URL and the SANs. This ensures future attribution.

A web service is sometimes part of an application package that contains many other web services. Consider the example of G Suite™ offered by Google Cloud™ that includes multiple web services like YouTube™, Google Search™, Gmail™, Hangouts™, Google Drive™, Good Cloud Platform™, and Google Docs™. Each of these web services can be accessed via multiple URLs, making them common sources.

Often, these web services share certificates issued for the entire application package. This results in common sources having non-exclusive subject alternative names (SANs). We refer to a common source with non-exclusive SANs as a suite common source. One example of a suite common source is YouTube™, which has the following SANs—"google-analytics.com", "google.com", "yt.be", "youtu.be", and "cloud.google.com". The first two are non-exclusive SANs that belong to Google Search™, the next two are exclusive SANs that belong to YouTube™, and the last one is a non-exclusive SAN that belongs to Google Cloud Platform™.

For unrecognized URLs, non-exclusive SANs in a certificate can cause attribution of other SANs to wrong roll-up families in the aggregation index. This in turn can result in improper attribution of network usage records. In the case of an unrecognized YouTube™ URL (e.g., "i.ytimg.com"), non-exclusive SANs for Google Search™ can be mistakenly relied upon by the network security system to misattribute the SANs for YouTube™ and Google Cloud Platform™ to Google Search™ roll-up family.

The technology disclosed uses a suite list to identify suite common sources. When the network security system intercepts an unrecognized URL that matches an entry in the suite list based on the certificate inspection for SANs, the network security system stores an indication that supplemental inspection, attribution, and roll up may be required to account for any misattributed SANs. The supplemental inspection, attribution, and roll up can be supervised by an administrator.

Since non-exclusive SANs for unrecognized URLs can cause misattribution, the technology disclosed uses deep inspection to attribute SANs of a suite common source to correct roll-up families in the aggregation index. Deep inspection uses deep application programming interface inspection (DAPII) and/or secure sockets layer (SSL) inspection to reveal a true common source invoked by an unrecognized URL, regardless of the SANs contained in the certificate accompanying the URL. The true common source is represented by a true roll-up family in the aggregation index. SANs of the suite common source that correlate to the true roll-up family are grouped together. SANs that do not correlate to the true roll-up family are stored in other roll-up families. Statistic attribution of network usage records for the URL occurs only at the true roll-up family and not the other roll-up families.

In another example, consider that the network security system receives an unrecognized URL "i.ytimg.com". The network security system then encounters the following SANs in the certificate accompanied with the URL— "google-analytics.com", "goolge.com", "yt.be", "youtu.be", and "cloud.google.com". The network security system uses deep inspection to determine that the true roll-up family of the URL is YouTube™. The network security system then automatically attributes "yt.be" and "youtu.be" to the YouTube™ roll-up family and performs statistic attribution of network usage records. The network security system automatically attributes "google-analytics.com" and "google-.com" to the Google Search™ roll-up family and "cloud-.google.com" to the Google Cloud Platform™ roll-up family and does not perform any statistic attribution.

Furthermore, family hierarchies are constructed in the aggregation index—where the web host that offers the application package is identified as a grandparent (e.g., Google Cloud™), the suite common resources part of the application package are identified as parents (e.g., YouTube™, Google Search™, Gmail™, Hangouts™, Google Drive™, Good Cloud Platform™, and Google Docs™), and the constituent family members are identified as children (e.g., "google-analytics.com", "goolge.com", "yt.be", "youtu.be", and "cloud.google.com").

Logging network usage with roll-up family identification increases options for generating aggregate statistics per family root name. Different criteria such as origin country or languages can be selected for aggregation. Additionally, the technology disclosed allows end users to generate an aggregate of aggregates per family root name. This is useful in a distributed environment where the end user is interested in determining usage of a specific web host across all distributed work or business locations.

System Overview

We describe a system and various implementations for aggregate network traffic monitoring. The system and processes are described with reference to FIG. 1 showing an architectural level schematic of a system in accordance with an implementation. Because FIG. 1 is an architectural diagram, certain details are intentionally omitted to improve the clarity of the description. The discussion of FIG. 1 is organized as follows. First, the elements of the figure are described, followed by their interconnections. Then, the use of the elements in the system is described in greater detail.

FIG. 1 includes the system 100. The system 100 includes organization networks 110 and 115, web crawler 120, public network(s) 125, network security system 130, and web services 140. Organization networks 110 and 115 include devices 112*a-n* and 117*a-n* respectively. Although not shown, system 100 also includes bring-your-own-devices (BYODs) that operate outside an organization network.

The network security system 130 is interposed between the devices 112*a-n*, 117*a-n* and the web services 140. It can be cloud-based or on-premise and includes, among other things, extractor 202, classifier 204, deep API inspector 206, secure sockets layer (SSL) inspector 208, aggregation index 210, and suite list 212. In implementations, the network security system 130 serves as a proxy.

System 100 also includes web services 140 like YouTube™, Salesforce™, Google™ and Dropbox™ that run on respective web service servers 140*a*, 140*b*, 140*c*, and 140*n*. In the context of this application, web services are also called "data sources". In cases where multiple URLs represent a same web service, the web service is referred to as a "common source". When a web service shares a certificate issued for an entire application package and has non-exclusive subject alternative names (SANs), it is referred to as a "suite common source".

The interconnections of the elements of system 100 are now described. The public network(s) 125 couples the devices 112*a-n* and 117*a-n*, the web crawler 120, the network security system 130, and the web services 140, all in communication with each other (indicated by solid double-arrowed lines). The actual communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications. Devices 112*a-n* and 117*a-n* can be desktop computers, laptops, tablet computers, mobile phones, or any other type of computing devices. The engines of system 100 such as the web crawler 120 and the network security system 130 are implemented by software running on varying types of computing devices. Example devices are a workstation, a server, a computing cluster, a blade server, and a server farm.

Having described the elements of FIG. 1 and their interconnections, elements of the figure will now be described in greater detail. Organization networks 110 and 115 can be in different countries but belong to a same organization. For example, organization network 110 can be at an organization's on-premise site in Australia and organization network 115 can be at the organization's on-premise site in India.

Devices 112*a-n* and 117*a-n* and bring-your-own-devices (BYODs) are configured with an endpoint routing client (not shown) that reroutes network traffic via the network security system 130. Depending on the type of device, the endpoint routing client can be a virtual private network (VPN) such as VPN-on-demand or per-app-VPN that use certificate-based authentication. For example, for iOS™ devices, it can be a per-app-VPN or can be a set of domain-based VPN profiles. For Android™ devices, it can be a cloud director mobile app. For Windows™ devices, it can be a per-app-VPN or can be a set of domain-based VPN profiles. Endpoint routing client can also be an agent that is downloaded using e-mail or silently installed using mass deployment tools like ConfigMgr™, Altris™, and Jamf™.

Network Security System

When users of devices 112*a-n* and 117*a-n* attempt to access web services 140, the network security system 130 intermediates communications between the devices 112*a-n* and 117*a-n* and the web services 140. Of particular note is that requests, such as a web browser request for a URL of a web service, are routed atypically. Specifically, the endpoint routing client running on the devices 112*a-n* and 117*a-n* identifies the request and securely tunnels the request to the network security system 130 rather than to the web services 140. Among other things, the network security system 130 analyzes a user identity associated with the devices 112*a-n* and 117*a-n* and the applicable policy before routing the request to the web services 140. Notably, from the perspective of the web services 140, the request will go back to the network security system 130, rather than directly to the devices 112*a-n* and 117*a-n*. The network security system 130 can analyze the returned data, apply further policies in a user identity dependent fashion and then return the response from the web services 140 to the devices 112*a-n* and 117*a-n*.

URL Processing

A general view of how the network security system 130 functions has been provided. The discussion will now focus on how the network security system 130 analyzes a URL and identifies URL components. In one implementation, the analysis includes extracting lexical and host-based features of the URL. Examples of lexical features are host names, domain names, subdomain names, path tokens, last path tokens, and top-level domains (TLDs). Examples of host-based features are IP prefixes, WHOIS properties, and geographic properties. The URL component extraction can be implemented by the extractor 202.

In some implementations, extractor 202 is a domain extraction library that breaks a URL into its component pieces and extracts a domain name, a subdomain name, and/or a TLD. In one implementation, the domain extraction library is not part of the network security system 130 and is invoked by the network security system 130 for component extraction purposes. An example domain extraction library called "tldextract" is described in more detail in "Accurately separate the TLD from the registered domain and subdomains of a URL, using the Public Suffix List," John Kurkowski, available at https://github.com/john-kurkowski/tldextract and incorporated herein by reference for all purposes.

In any case, the network security system 130 can analyze an example URL like "https://uk.youtube.com/user/CNN" and identify the URL components as follows:

| URL Component | Value |
|---|---|
| subdomain name | uk |
| domain name | youtube |
| top-level domain (TLD) | .com |
| path | /user/CNN |
| protocol | https |

Often, at least one URL component identifies the web service requested by a URL. In the table above, the domain name identifies YouTube™ as the requested web service. In other examples, different or additional URL components like subdomain names and TLDs can identify the web service requested by a URL.

In scenarios where a URL does not identify the requested web service (e.g., a Google Docs™ URL like "https://goo.gl.com/file/d/0B6Xtv_R24FQ3ZVdtaXQxWFRTOENVeGR0cmxESFU5Zw/edit"), network security system 130 uses deep application programming inspection (DAPII) to further analyze the URL and identify a true web service requested by the URL. DAPII uses application definitions to parse and interpret the URL and its accompanying parameters. Application definitions are specific to web services and use application variables and fields to define how web service transactions should be parsed on a per-web service basis. The parsing reveals specific web resources and custom condition variables on a per-web service basis. Also, matches can be any of literal matches, pattern matches, and/or regular expression matches. The language to represent application definitions is related to the Web Application Definition Language (WADL), with significant additions for purposes of providing network security systems. DAPII can be implemented by the deep API inspector 206.

A sample set of application variables used for DAPII according to one implementation includes the following:

| Variable | Description | Evaluation |
|---|---|---|
| Web service identifier (ID) or name | In an application definition, the <id> part specifies either a "host" field match or a "url" match to determine the true web service identity. | Match; can be grouped, e.g., a collection of Google-web services can be interlinked. |
| Resource identifier (ID) or name | Identify a "resource" of a web service; resources are generally defined by a URL or URI path. Resources correspond to method invocation for many web services. | Match; can be within the scope of a web service, e.g., a resource for web service A does not impact flows for web service B. |
| Custom variables | Custom variables are defined by application definitions to extract and store key information, e.g., a login name. | Match. |
| Custom event triggers | Custom triggers are defined by application definitions to signal significant events, e.g., user login, document access, file upload, etc. This can trigger a "login-failed" or "upload-attempted" event. Policies can be defined to take action when the custom trigger occurs. | Match. |

A sample set of application fields used for DAPII according to one implementation includes the following:

| Field | Parsing Option | Control Option |
|---|---|---|
| http_host | Postfix; *.youtube.com; exact match, e.g., uk.youtube.com. | The identifier (ID) of data source, e.g., YouTube, can be extracted as well. |
| http_host | Parsing with application variables, e.g., uk.youtube.com. | The <id> part of an application definition extracts the data source ID, e.g., YouTube. |

-continued

| Field | Parsing Option | Control Option |
|---|---|---|
| http_url | URL is of form: /<path1.? .../<pathn>/<file>[?<k=v;]. URL parameters are broken into compound objects with an ordered list of path and file names and an optional list of key-value pairs that are extracted from the URL parameters. In many cases, <path> combination and variable matching varies from web service to web service. For example, Google Drive for person use is of form: /{doc-type}/d/<random doc ref #>/<action>, e.g., /file/d/0B6Xtv_R24FQ3ZVdtaXQxWFRTOENVeGR 0cmxESFU5Zw/edit. A Google App Google Drive document has the addition of Google App account values: /a/<gapp-account>/{doc-type}/d/<random doc ref #>/<action>, e.g., /a/netskope.com/document/d/1wK4e7jp5PiGoY-a_J6uwoDzWsnICUlRdItCRMRVIPNM/edit. | Match. |
| http_method | GET, POST, and PUT. | Matched against <resource>:<method> part of an application definition. |

A first example of an application definition is shown in FIG. 3 and includes application definition 300 for Google Docs™. As the short example shows, this is a relatively simple service to define with the identity (<id> XML tags) determined by simple XML matching. Next, resources are defined and an example of how a parameter URL can be parsed and parameters extracted to assign to variables is shown with <basepath> and <resource> XML tags. No triggers are used in this example since the URLs are sufficient for identifying the flow actions of concern, e.g., document access, file upload, etc. Also, in this example a custom variable for the document id is established.

FIG. 4 with application definition 400 for Dropbox™ provides an example of defining a more complex web service. Here, URLs are insufficient and triggers are added to find the request/response and make determinations. In this example, the custom variable "logine" allocates an application-specific user-persistent variable. The variable has the value type (vtype) of string. The metadata setting indicates that it is an "email" address. Lastly, the type indicates the persistence—"conn" here, meaning the variable will persist for the connection. As shown, the login form email address is used to update the user field if later the login is successful, e.g., "<extract>" tag as well as "<find-and-update-user>" tag. In this context, "connection" refers to a high-level non-network construct (e.g., not a TCP/IP connection) but rather a series of multiple related networks requests and responses. Thus, a series of requests and responses over the course of a day could be a single connection within an application, e.g., all use of Salesforce.com™ within a period without logging off. One definition of a connection is to look at the application session identifier, e.g., cookie or URL parameter, used by the web service so that each connection corresponds to a single session identifier.

A typical user interaction with a web service like Salesforce.com™ consists of a sequence of events that occur in the context of a session. The main events of note are: (a) login—provide user credentials to web service to authenticate the user; (b) application transactions—execute a set of application level transactions, e.g., add leads or define new campaigns; and (c) log-out—this event terminates the session with the server. In this context an application session connects these interactions for the network security system. Deep packet inspection logic can identify these events and link policy evaluations to each transaction boundary enabling actions to be taken. Most commonly, the application session is identified by a session cookie in the HTTP header. The network security system 130 can use the session cookie to define the session.

The trigger here in this implementation requires each valid status to be spelled out, e.g., separate match tests are required for 200 status and for 302 status. However, some implementations may include shortcuts for matching HTTP responses, e.g., "SUCCESS", and/or accept regular expressions for matching, e.g., "200|302".

In yet another implementation, network security system 130 uses secure sockets layer (SSL) inspection to analyze the data returned for a URL and identify the true web service requested by the URL. When a web service server responds to the URL, the response comprises data packets that are intercepted by the network security system 130. The network security system 130 performs SSL inspection on the data packets and detects a host header. The host header includes a server name indication (SNI) associated with the web service server. The SNI identifies the true web service.

Aggregation Index

Having described how the network security system 130 extracts URL components from a URL and identifies a true web service requested by a URL, the discussion now turns to the aggregation index 210.

Building/Updating Aggregation Index

Figure 7:
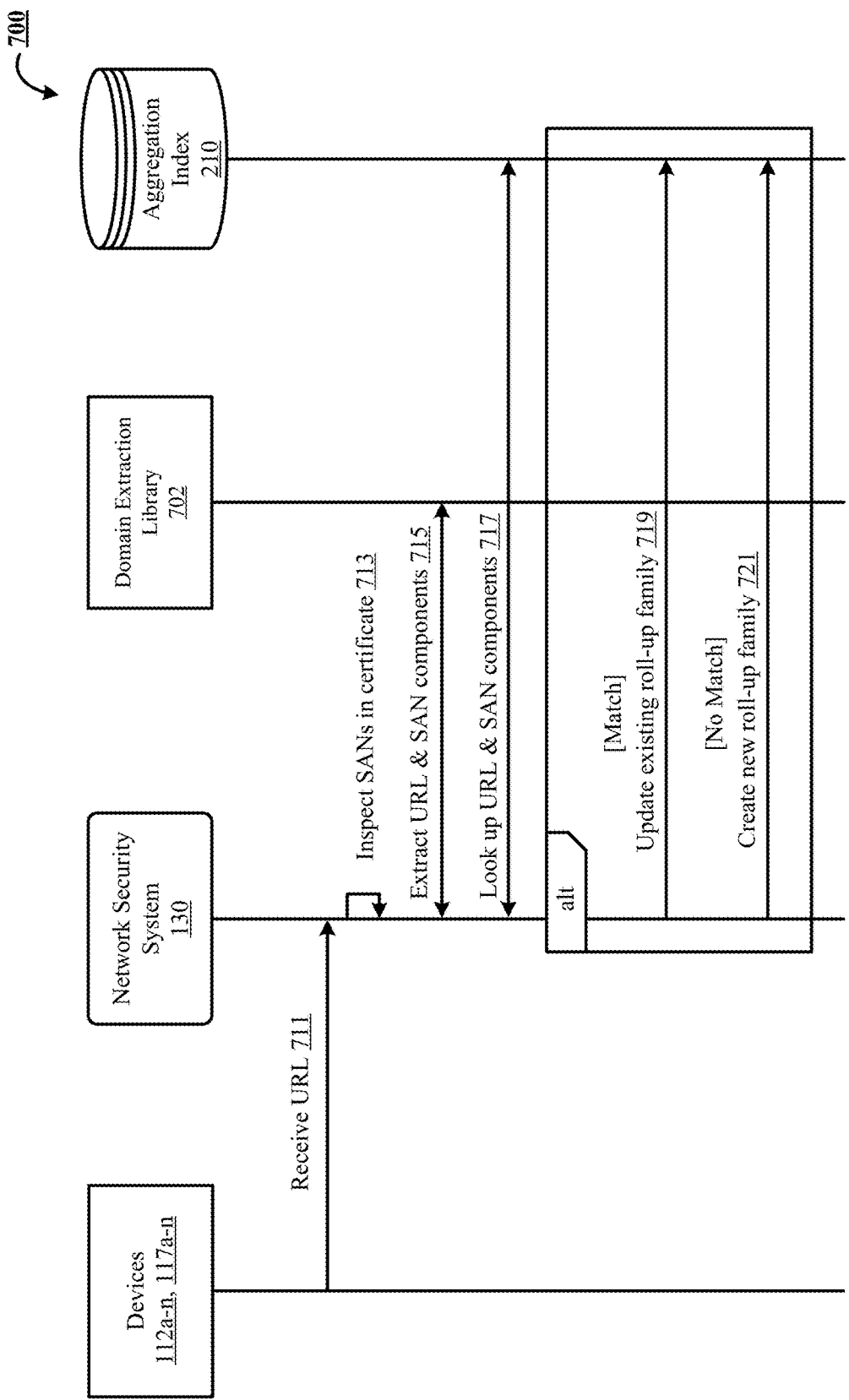
FIG. 7 is a message sequence diagram of using certificate inspection to build and/or update the aggregation index.

The technology disclosed uses two approaches to build and/or update the aggregation index 210. The first approach (shown in FIG. 7) involves the network security system 130 and the second approach (not shown) involves the web crawler 120.

The first approach is proxy driven. As part of its real-time monitoring of network traffic, the network security system 130 intercepts and automatically inspects digital certificates exchanged between the devices 112a-n, 117a-n and the web services 140. The certificate exchange typically occurs as part of the client-server handshake during connection establishment. Examples of certificates are secure sockets layer (SSL)/transport layer security (TLS) certificates exchanged during SSL/TLS handshakes.

Message sequence diagram 700 illustrates the process of building and/or updating the aggregation index 210. The process begins with the network security system 130 receiving a URL at message 711. In response, the web service server requested by the URL sends a certificate to prove its identity to the requesting device. The network security system 130 intercepts the certificate and automatically inspects it for subject alternative names (SANs). The automated inspection occurs at message 713.

Subject Alternative Names (SANs)

Figure 5A:
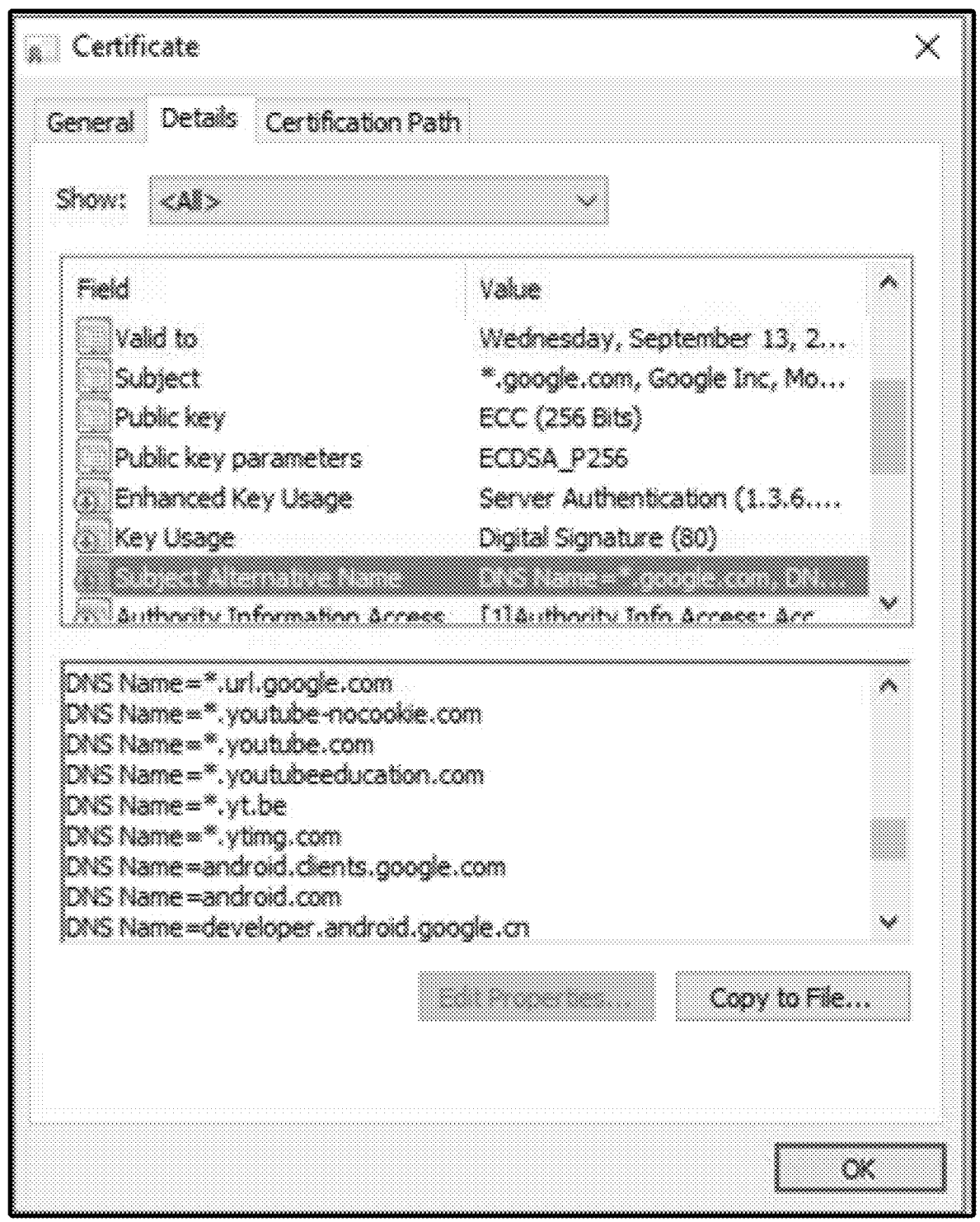
FIGS. 5A-5B are two examples of SAN certificates.
Figure 5B:
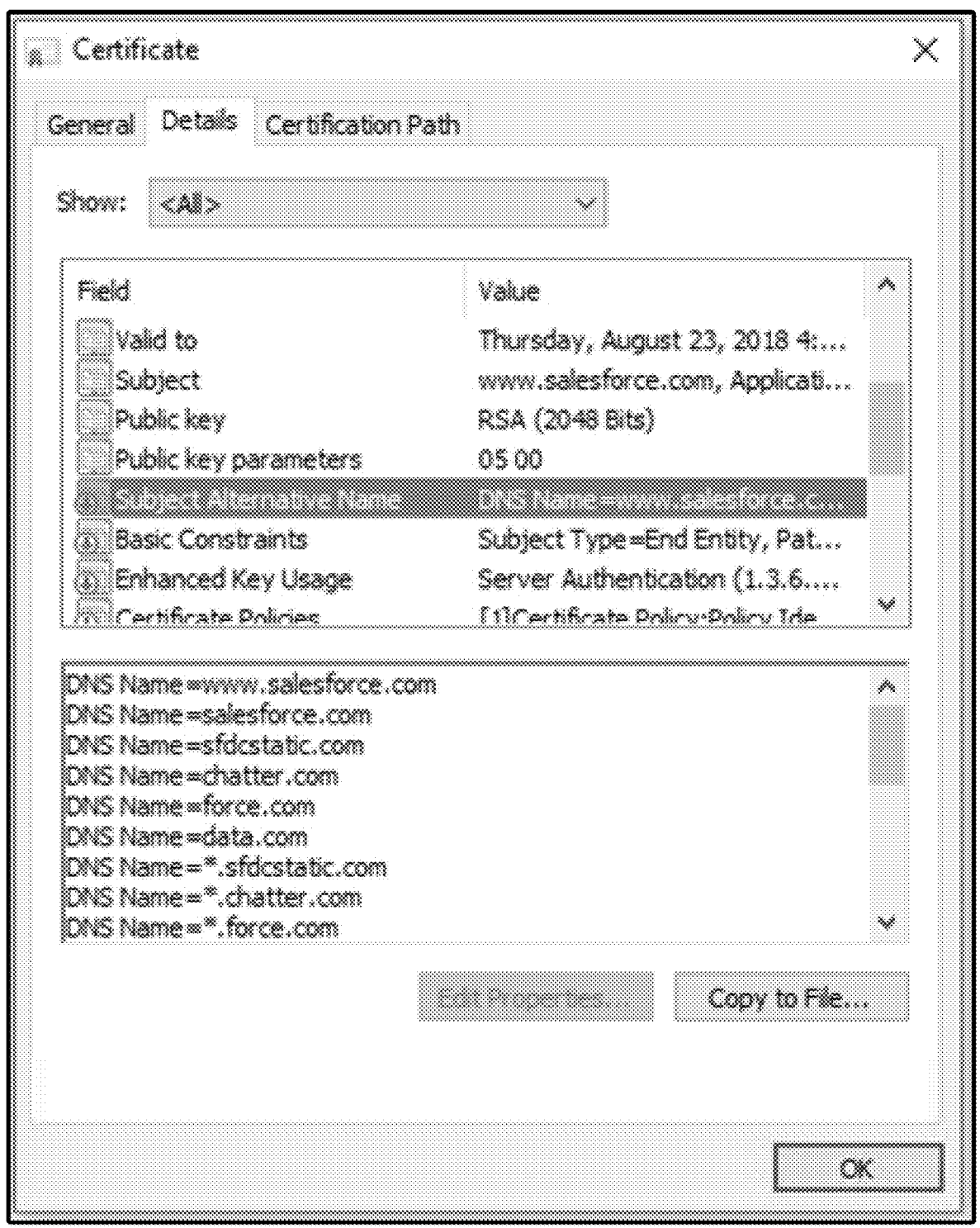

Regarding SANs, certificates have a number of embedded attributes, including a validity period, a subject name, and one or more SANs. A normal certificate contains a single name, but a SAN certificate has multiple SANs. A SAN can be a host name (e.g., site, IP address, common name, registered name, etc.), domain name, or a complete URL. SANs are typically used for environments or platforms that need to secure multiple sites (names) across different domains/subdomains. FIGS. 5A-5B are two examples of SAN certificates—one for YouTube™ and another for Salesforce.com™. SAN certificate 500A accompanied the URL "https://www.youtube.com/" and includes at least "*.youtube-nocookie.com", "*.youtube.com", "*.youtubeeducation.com", "*.yt.be", and "*.ytimg.com" as SANs. SAN certificate 500B accompanied the URL "https://www.salesforce.com/" and includes at least "salesforce.com", "sfdc-static.com", "chatter.com", "force.com", and "data.com" as SANs.

For component extraction purposes, the network security system 130 subjects SANs to processing similar to URLs. The network security system 130 sends the URL and the SANs to a domain extraction library 702 to extract URL and SAN components. The URL and SAN components can be domain names, subdomain names, or host names (e.g., site, IP address, common name, registered name, etc.). The extraction occurs at message 715.

When building the aggregation index 210, the URL, the URL components, the SANs, and the SAN components are used as starting family members of a new roll-up family in the aggregation index 210. A common designator among the URL and SANs is used as the family root name of the new roll-up family. In some implementations, the common designator is identified by calculating a term frequency-inverse document frequency (tf-idf) statistic over a URL and its SANs. In other implementations, it is the subject name or domain name of the URL. In the example of SAN certificate 500A, "youtube" is the common designator and thus used as the family root name, with the URL and SANs being used as family members of the youtube roll-up family. In the example of SAN certificate 500B, "salesforce" is the common designator and thus used as the family root name, with the URL and SANs being used as family members of the salesforce roll-up family. This is illustrated in FIGS. 6A-6B.

When updating the aggregation index 210, the network security system 130 compares the URL, the URL components, the SANs, the SAN components, and the SNIs to entries in the aggregation index 210. This look up occurs at message 717.

If the look up returns a match with an existing roll-up family in the aggregation index 210, the network security system 130 then stores the URL, the URL components, the SANs, and/or the SAN components as new family members of the existing roll-up family. The update to the existing roll-up family occurs at message 719.

If the look up does not return a match with an existing roll-up family in the aggregation index 210, the network security system 130 then creates a new roll-up family in the aggregation index 210, using the common designator as the family root name, and the URL, the URL components, the SANs, and/or the SAN components as starting family members of the new roll-up family. The update adding the new roll-up family occurs at message 721.

In the second approach of building and/or updating the aggregation index 210, the web crawler 120 systematically and periodically browses the worldwide web to mine SAN certificates of most visited websites (identified by a ranking service like Quantcast™). The URLs and SANs linked to the SAN certificates are then subjected to component extraction, as discussed above. The URL, the URL components, the SANs, and/or the SAN components are then used to either update existing roll-up families or create new roll-up families in the aggregation index 210, as discussed above.

Roll-Up Families & Family Members

Aggregation index 210 maps URLs, domain names, and subdomain names to roll-up families. FIG. 6A shows one implementation of the aggregation index 210 with roll-up families 611 mapped to their respective family members 615. In addition, a domain name for each family root name is also identified in column 613. As discussed above, the family members can be URLs, URL components, SANs, and/or SAN components that represent a common source such as YouTube™ or Salesforce.com™. Also, the family root name can be a common designator among the family members. In some implementations, a family root name is the label that identifies a roll-up family and the represented common source, with the roll-up family mapped to its family members. In other implementations, a roll-up family is a row in the aggregation index 210, comprising the respective family root name, the domain name, and the family members.

Statistic Attribution

Having described the aggregation index 210, the discussion now turns to how the aggregation index 210 is used for statistic attribution.

The technology disclosed uses the aggregation index 210 to automatically aggregate network usage records for varying URLs of a common source and attribute them to a family root name of a roll-up family. This involves labelling data volume statistics for aggregation by attribution and family roll-up in the aggregation index 210. The example in FIG. 6B uses bandwidth (Mbits/s) as the data volume statistic. Other examples of data volume statistics such as frame rate, throughput, connections per second, concurrent connections, and transactions per second will be apparent to one skilled in the art.

In FIG. 6B, two roll-up families are shown—one for YouTube™ and another for Salesforce.com™. Network usage records for family members are rolled up to the respective family root name. For youtube, the aggregated labelled data volume statistic 621 is 6.7 (2.5+0.7+1.2+1.6+0.5+0.2). For salesforce, the aggregated labelled data volume statistic 623 is 3.3 (1.4+0.7+0.5+0.2+0.4+0.1).

In one implementation, an aggregated labelled data volume statistic represents bandwidth consumption by a data source across different countries. Consider the example of a YouTube™ roll-up family whose family members are different URLs used as landing pages in three countries—Australia, India, and United Kingdom. An organization that has employees in the three countries can use an aggregated statistic to determine how much bandwidth YouTube™ is consuming at an organization level across the three countries. The employees can operate within an on-premise organization network on enterprise devices or outside the organization network on bring-your-own-devices (BYODs).

In another implementation, an aggregated labelled data volume statistic represents bandwidth consumption by multiple data sources that can be pooled via a private circuit data connection. Consider the example of a Microsoft Office 365™ roll-up family whose family members are different URLs of multiple Office 365™ offerings such as Outlook-.com™ OneDrive™, Calendar™, Word Online™, Excel Online™, PowerPoint Online™, OneNote Online™, Sites™, SharePoint™, Survey™, Classroom™, Forms™, Delve™, Video™, Tasks™, People™, Yammer™, Class Notebook™, Planner™, and Skype™. An organization that uses multiple Office 365™ offerings can use an aggregated statistic to determine how much bandwidth Microsoft Office 365™ suite is consuming at an organization level across the multiple offerings. In turn, the aggregated statistic can be used to justify procurement of an Azure ExpressRoute™ private circuit data connection from Microsoft Office 365™.

Statistic Attribution for Attributed URLs

Statistic attribution for URLs previously attributed to the aggregation index 210 is now described with reference to message sequence diagram 800. When the network security system 130 receives a URL at message 811, it sends the URL to the domain extraction library 702 for URL component extraction. The extracted URL components can be domain names, subdomain names, or host names (e.g., site, IP address, common name, registered name, etc.). The extraction occurs at message 813. In implementations, the extraction is optional and not performed.

The network security system 130 then compares substrings of the URL to entries in the aggregation index 210. The substrings can be the extracted URL components. Substrings can also be substrings of the extracted URL components. Also, matches can be any of literal matches, pattern matches, and/or regular expression matches. The comparison occurs at message 815.

Based on the comparison, the network security system 130 classifies the URL as either attributed or unattributed. If the URL or a URL substring or component is present in the aggregation index 210 as a family member of an existing roll-up family (or contained in a family member as a substring of the family member), it is considered attributed. Otherwise, it is considered unattributed. Processing of unattributed URLs is described below with reference to FIG. 9.

Message 817 identifies the URL as being attributed. In response, the network security system 130 attributes network usage records for the URL to the existing roll-up family in the aggregation index 210. The statistic attribution occurs at message 819.

Returning to the salesforce roll-up family example in FIG. 6B, consider the following example URL—"https://www.salesforce.com/products/einstein/overview/?d=7010M000001yE38&internal=true". Because the substring "einstein" is present both in the example URL and in the "*.einstein.com" family member 625 of the salesforce roll-up family, the example URL is classified as attributed. As a result, network usage records for the example URL such as bytes sent/received are attributed to the family member 625 and rolled up to the salesforce family root name 623 for statistic aggregation.

Statistic Attribution for Unattributed URLs

Figure 8:
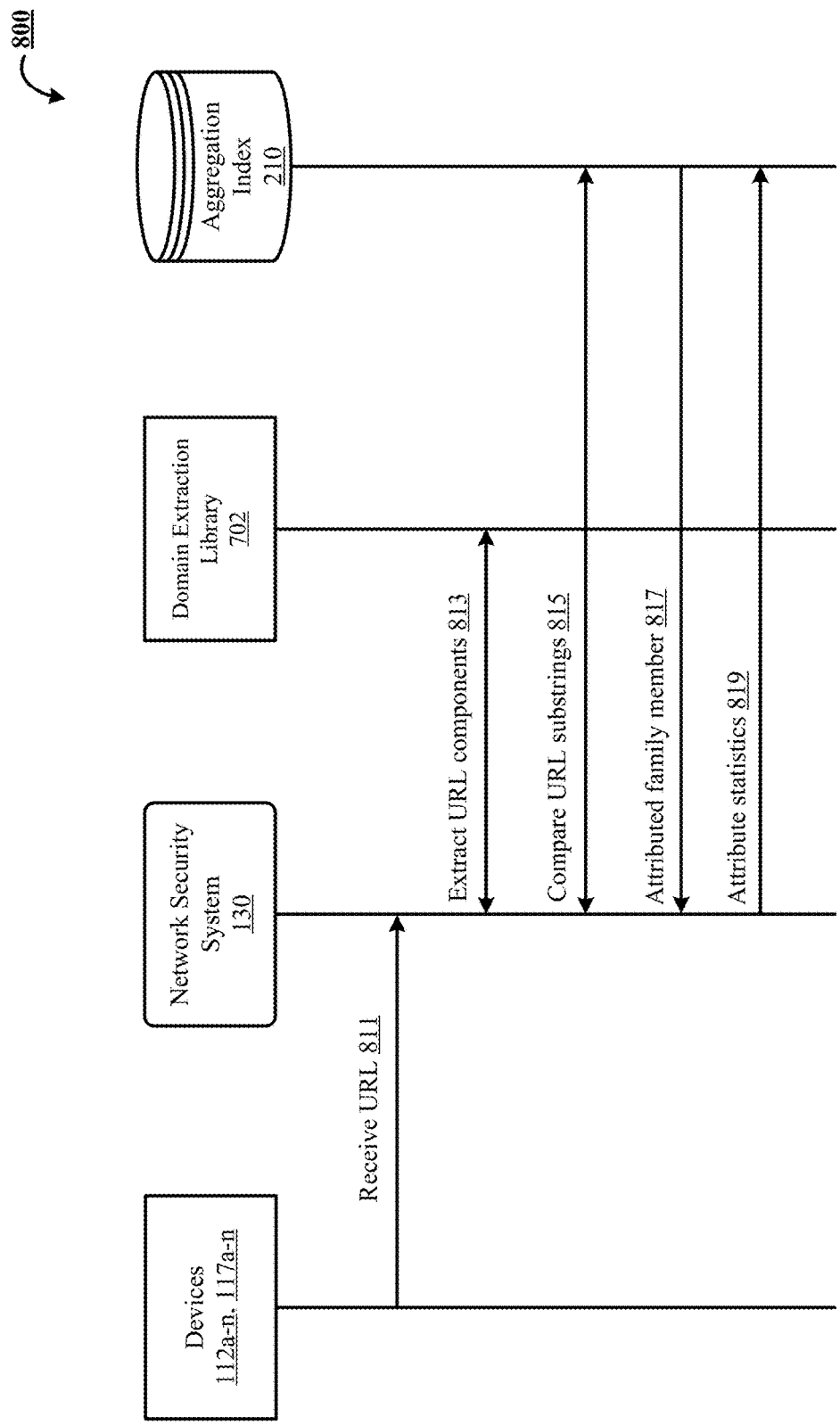
FIG. 8 illustrates a message sequence diagram of aggregating network usage records for URLs previously attributed to the aggregation index.
Figure 9:
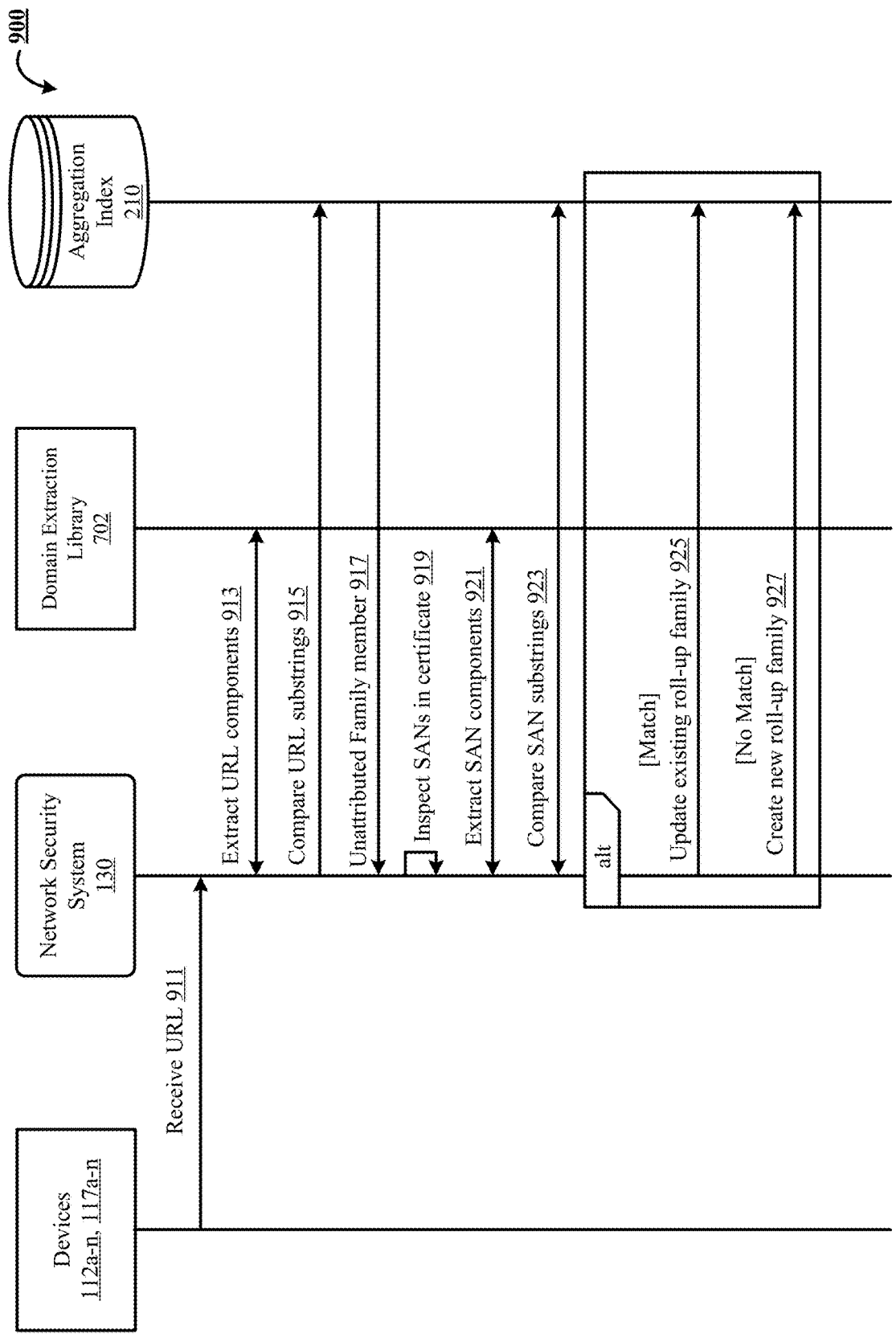
FIG. 9 shows a message sequence diagram of using subject alternative names (SANs) to aggregate network usage records for URLs not previously attributed to the aggregation index.

Statistic attribution for URLs previously not attributed to the aggregation index 210 is now described with reference to message sequence diagram 900. Messages 911, 913, 915, and 917 are similar to corresponding messages in FIG. 8, except, unlike the URL in FIG. 8, the URL in FIG. 9 is not found in the aggregation index 210 and thus initially classified as unattributed.

For the unattributed URL, the network security system 130 automatically inspects a certificate accompanied with the URL for subject alternative names (SANs). The inspection occurs at message 919.

The network security system 130 then sends the SANs to the domain extraction library 702 for SAN component extraction. The extracted SAN components can be domain names, subdomain names, or host names (e.g., site, IP address, common name, registered name, etc.). The extraction occurs at message 921. In implementations, the extraction is optional and not performed.

The network security system 130 then compares substrings of the SANs to entries in the aggregation index 210. The substrings can be the extracted SAN components. Substrings can also be substrings of the extracted SAN components. Also, matches can be any of literal matches, pattern matches, and/or regular expression matches. The comparison occurs at message 923.

Based on the comparison, the network security system 130 classifies the SANs as either attributed or unattributed. If at least one SAN or a substring or component of the SAN is present in the aggregation index 210 as a family member of an existing roll-up family (or contained in a family member as a substring of the family member), the URL is treated as an attributed URL.

In response to the URL being reclassified as attributed based on the SAN-based comparison, the network security system 130 updates the aggregation index 210 and correlates the URL and/or the SANs and/or their components to the existing roll-up family to prevent future misclassification. The update to the existing roll-up family occurs at message 925 and includes family membership attribution of the URL and any unmatched SANs and statistic attribution of network usage records of the URL.

If both the URL and the SANs are unattributed and not found in the aggregation index 210, the network security system 130 creates a new roll-up family in the aggregation index 210 based on the URL and the SANs. This ensures future attribution. The update adding the new roll-up family occurs at message 927 and includes family membership attribution of the URL and the SANs, statistic attribution of network usage records of the URL, and using a common designator among the URL and SANs as the family root name.

Suite Common Sources

Having described statistic attribution using the aggregation index 210, the discussion now turns to handling of suite common sources.

Supplemental Inspection

For unrecognized URLs, non-exclusive SANs of a suite common source can cause attribution of other SANs to wrong roll-up families in the aggregation index 210. To address this problem, the technology disclosed uses the suite list 212 which identifies and lists different suite common sources like G Suite™ and Microsoft Office 365™.

Figure 10A:
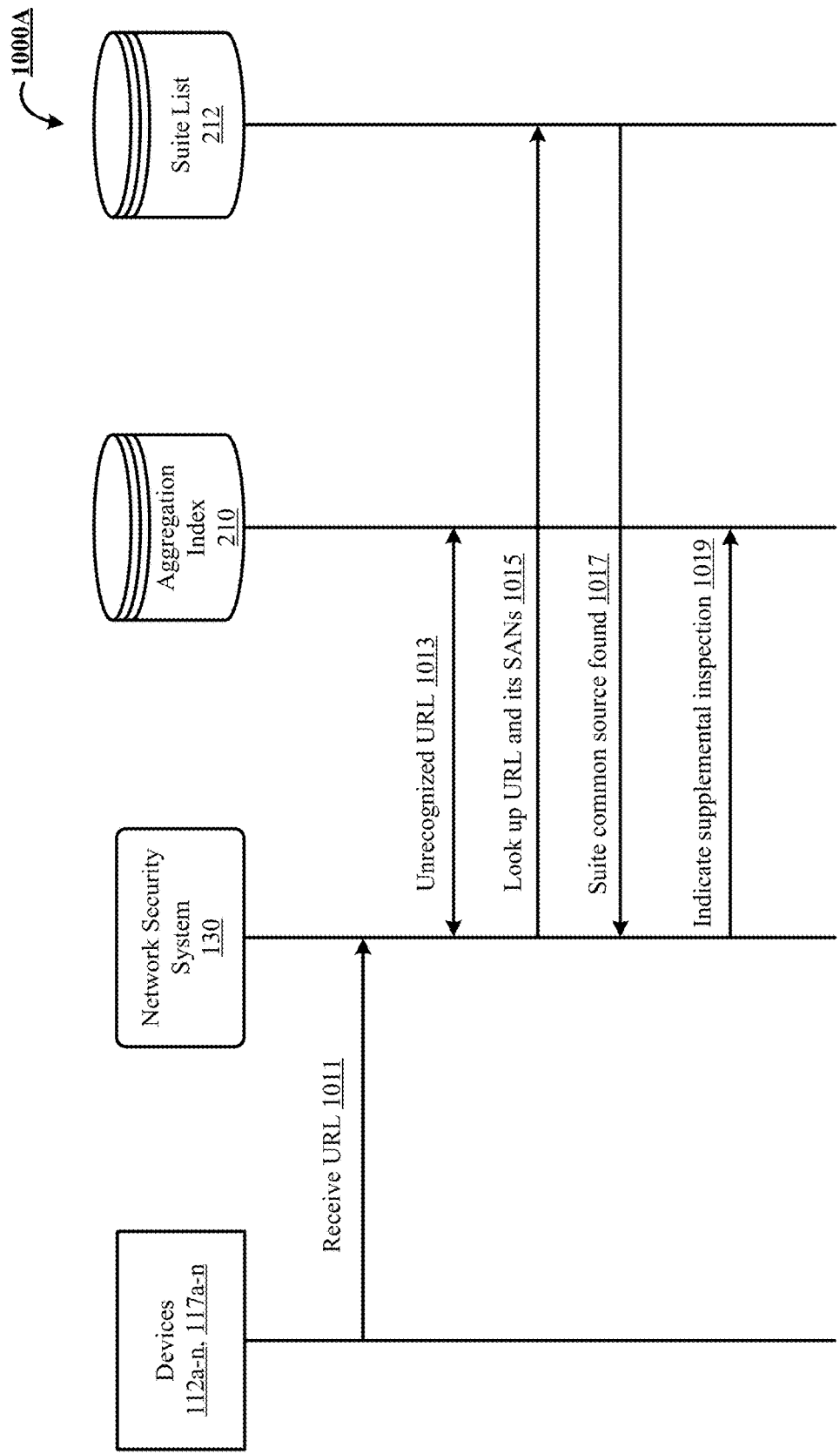
FIG. 10A is a message sequence diagram of using a suite list to perform supplemental inspection of aggregated network usage records for URLs specifying suite common sources.

FIG. 10A is a message sequence diagram 1000A of using the suite list 212 to perform supplemental inspection of aggregated network usage records for URLs specifying suite common sources. When the network security system 130 intercepts a URL at message 1011, it looks up the URL in the aggregation index 210 to determine whether the URL is present in the aggregation index 210. If the URL is not present, it is classified as an unrecognized URL at message 1013. An unrecognized URL is the same as an unattributed URL, according to some implementations.

The network security system 130 then compares substrings/components of the unrecognized URL and substrings/components of its SANs to entries in the suite list 212. The comparison occurs at message 1015.

When the comparison returns a match at message 1017, the network security system 130 stores an indication that supplemental inspection, attribution, and roll up may be required to account for any misattributed SANs. The supplemental inspection, attribution, and roll up can be supervised by an administrator. The storage occurs at message 1019.

Deep API Inspection (DAPII)

Since non-exclusive SANs for unrecognized URLs can cause misattribution, the technology disclosed uses deep inspection to attribute SANs of a suite common source to correct roll-up families in the aggregation index. As discussed above, deep inspection uses deep application programming interface inspection (DAPII) and/or secure sockets layer (SSL) inspection to reveal a true common source invoked by an unrecognized URL, regardless of the SANs contained in the certificate accompanying the URL.

Figure 10B:
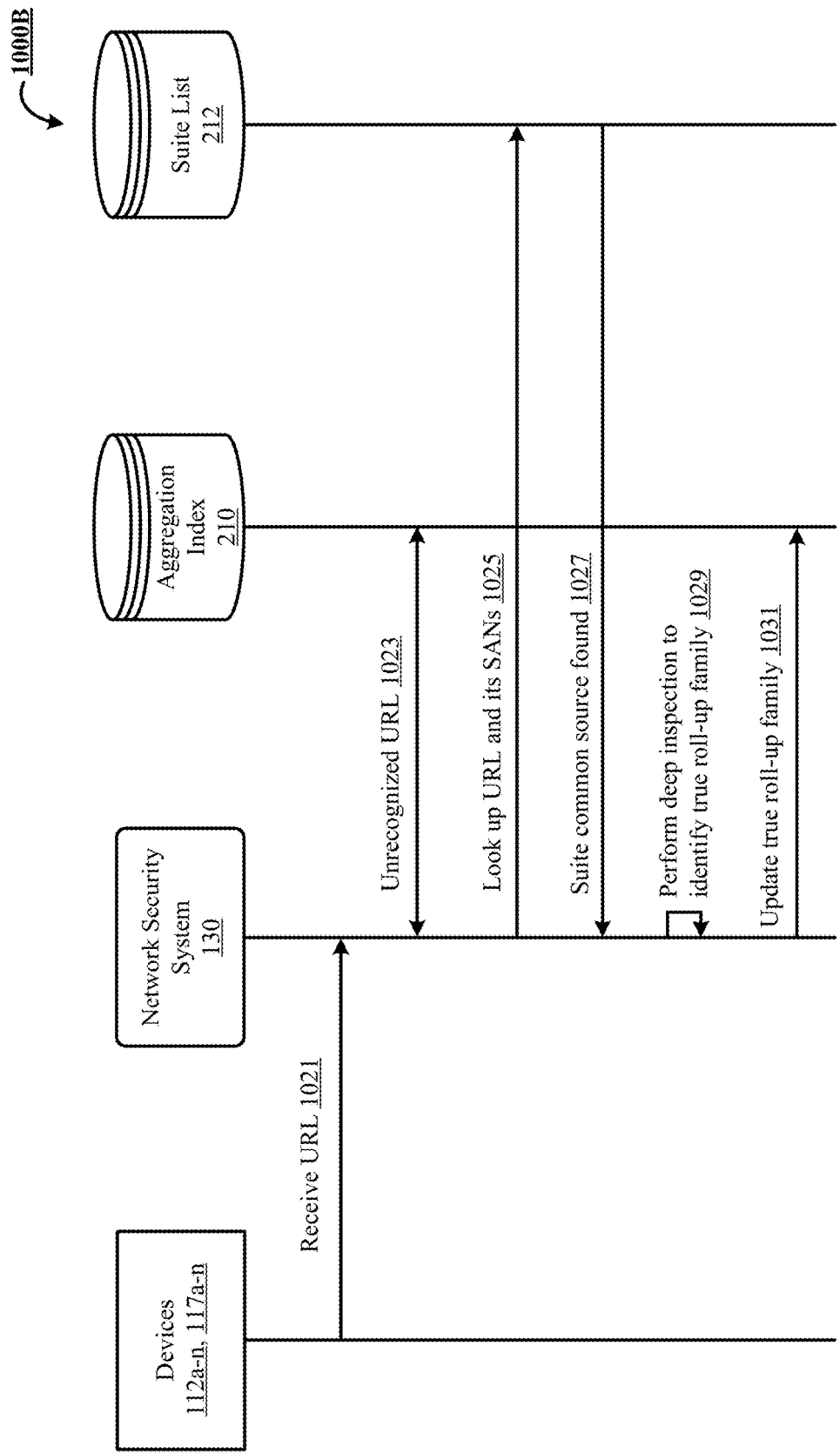
FIG. 10B depicts a message sequence diagram of using deep inspection to aggregate network usage records for URLs specifying suite common sources.

FIG. 10B depicts a message sequence diagram 1000B of using deep inspection to aggregate network usage records for URLs specifying suite common sources. Messages 1021, 1023, 1025, and 1027 are similar to corresponding messages in FIG. 10A.

At message 1029, the network security system 130 uses deep inspection to identify a true common source requested by the unrecognized URL. Based on comparison and matching, the true common source is mapped to a true roll-up family in the aggregation index 210.

At message 1031, SANs of the unrecognized URL that correlate to the true roll-up family are grouped together. SANs that do not correlate to the true roll-up family are stored in other roll-up families. Statistic attribution of network usage records for the URL occurs only at the true roll-up family and not the other roll-up families.

Efficient Policy Enforcement

Some implementations of the technology disclosed include using the roll-up families of the aggregation index 210 for efficient policy enforcement such that global policies can be applied to groups of URLs on a family root-basis. For additional information about policy enforcement, reference can be made to commonly owned U.S. application Ser. Nos. 14/198,499, 14/835,640, and 15/368,240.

Computer System

Figure 11:
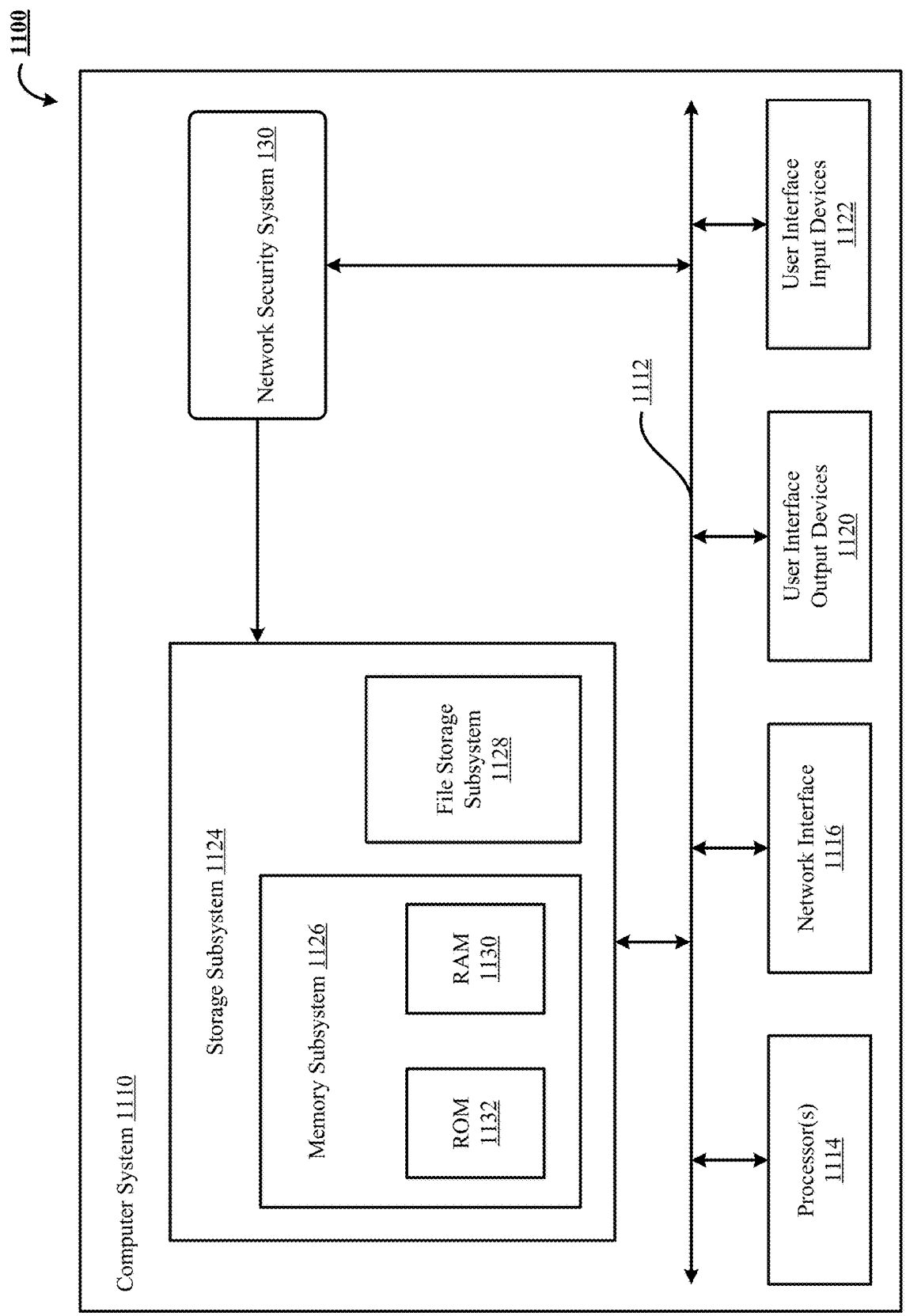
FIG. 11 is a simplified block diagram of a computer system that can be used to implement the network security system.

FIG. 11 is a simplified block diagram 1100 of a computer system 1110 that can be used to implement the network security system 130. Computer system 1110 typically includes at least one processor 1114 that communicates with a number of peripheral devices via bus subsystem 1112. These peripheral devices can include a storage subsystem 1124 including, for example, memory devices and a file storage subsystem, user interface input devices 1122, user interface output devices 1120, and a network interface subsystem 1116. The input and output devices allow user interaction with computer system 1110. Network interface subsystem 1116 provides an interface to outside networks, including an interface to corresponding interface devices in other computer systems.

User interface input devices 1122 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1110.

User interface output devices 1120 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1110 to the user or to another machine or computer system.

Storage subsystem 1124 stores programming and data constructs that provide the functionality of some or all of the modules and methods described herein. These software modules are generally executed by processor 1114 alone or in combination with other processors.

Memory 1126 used in the storage subsystem can include a number of memories including a main random access memory (RAM) 1130 for storage of instructions and data during program execution and a read only memory (ROM) 1132 in which fixed instructions are stored. A file storage subsystem 1128 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1128 in the storage subsystem 1124, or in other machines accessible by the processor.

Bus subsystem 1112 provides a mechanism for letting the various components and subsystems of computer system 1110 communicate with each other as intended. Although bus subsystem 1112 is shown schematically as a single bus, alternative implementations of the bus subsystem can use multiple busses.

Computer system 1110 can be of varying types including a workstation, server, computing cluster, blade server, server farm, or any other data processing system or computing device. Due to the ever-changing nature of computers and networks, the description of computer system 1110 depicted in FIG. 11 is intended only as one example. Many other configurations of computer system 1110 are possible having more or fewer components than the computer system depicted in FIG. 11.

Particular Implementations

The technology disclosed relates to aggregate network traffic monitoring by a network security system.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A system implementation of the technology disclosed includes one or more processors coupled to the memory. The memory is loaded with computer instructions for aggregate network traffic monitoring. The system uses a proxy to monitor network traffic between an organization network and an external network and collects data volume statistics for interactions between endpoints inside the organization network with data sources outside the organization network. The proxy can be the network security system 130. The proxy can monitor network traffic emanating from on-premise enterprise devices operating within an organization network, as well as bring-your-own-devices (BYODs) operating outside the organization network. The data sources can be the web services 140.

The system labels the data volume statistics for aggregation by attribution and family roll-up in an aggregation index. The aggregation index can store unified resource locators (URLs), domain names, and subdomain names that represent a common data source as family members of a roll-up family.

For attribution, a statistic that measures data received from a web server is attributed to a family member of a roll-up family in the aggregation index. The web server is specified by an unrecognized URL not found in the aggregation index. The unrecognized URL can specify a content delivery network (CDN). Also, the attribution is based on inspection of subject alternative names (SANs) identified in a certificate used for establishing a secure connection with the web server.

For family roll-up, a statistic that measures data received from or attributed to family members is rolled up to a family root of a roll-up family in the aggregation index.

The system can then report or persist the labelled data volume statistics for use in a further process. The labelled data volume statistics can be aggregated by family roots.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The proxy can populate the aggregation index by—(1) inspecting a certificate accompanying a received URL for SANs and (2) attributing the URL and the SANs as new family members of an existing roll-up family or starting family members of a new roll-up family.

A web crawler can populate the aggregation index by—(1) mining certificates accompanying URLs of most visited websites for SANs and (2) attributing the URLs and the SANs as new family members of existing roll-up families or starting family members of new roll-up families.

The proxy can compare at least a sub string of a received URL to entries in the aggregation index and classify the URL as attributed or unattributed. If the URL is previously attributed to a roll-up family as a family member, the proxy attributes a statistic that measures data received from the URL to the roll-up family. If the URL is unattributed and not found in the aggregation index, the proxy compares at least a substring of one or more SANs of the URL to entries in the aggregation index and classifies the SANs as attributed or unattributed.

If at least one SAN of the URL is previously attributed to a roll-up family as a family member, the proxy attributes a statistic that measures data received from the URL to the roll-up family and adds the URL to the roll-up family.

If the SANs are unattributed and not found in the aggregation index, the proxy creates a new roll-up family based on the URL and the SANs.

Family members of a roll-up family can share a common designator. The common designator can be a domain name, a subdomain name, or a host name (e.g., site, IP address, common name, registered name, etc.).

When the proxy receives an unrecognized URL with SANs, including non-exclusive SANs, it can compare at least a substring of the URL to entries in a suite list and classify the URL as representing a suite common source. The proxy can—(1) attribute the URL and the SANs as family members of a roll-up family in the aggregation index and (2) attribute a statistic that measures data received from the URL to the roll-up family. The proxy can also store an indication requiring supplemental inspection of the SANs and the statistic. The supplemental inspection can be supervised by an administrator.

When the proxy receives an unrecognized URL with SANs, including non-exclusive SANs, it can use deep inspection to determine a true roll-up family for the URL in the aggregation index. Deep inspection comprises deep application programming interface inspection (DAPII) and/or secure sockets layer (SSL) inspection. The proxy can attribute, to the roll-up family, SANs that correlate to at least one family member of the true roll-up family. The proxy can also attribute a statistic that measures data received from the URL to the true roll-up family. Without any statistic attribution, the proxy can further attribute, to other roll-up families, SANs that do not correlate to any family members of the true roll-up family.

Labelled data volume statistics aggregated by a family root can aggregate data across countries from a data source with distinct URLs. In response to a query, the proxy can display the aggregated statistics that identify bandwidth consumption by the data source across the countries.

Labelled data volume statistics aggregated by a family root can aggregate data from multiple data sources that can be pooled via a private circuit data connection. In response to a query, the proxy can display the aggregated statistics that identify potential pooled data flow over the private circuit data connection.

Other implementations may include a non-transitory computer readable storage medium storing instructions executable by a processor to perform functions of the system described above. Yet another implementation may include a method performing the functions of the system described above.

A method implementation of the technology disclosed includes aggregate network traffic monitoring. The method includes monitoring network traffic between an organization network and an external network and collecting data volume statistics for interactions between endpoints inside the organization network with data sources outside the organization network.

The method includes labelling the data volume statistics for aggregation by attribution and family roll-up in an aggregation index. The aggregation index can store unified resource locators (URLs), domain names, and subdomain names that represent a common data source as family members of a roll-up family.

For attribution, a statistic that measures data received from a web server is attributed to a family member of a roll-up family in the aggregation index. The web server is specified by an unrecognized URL not found in the aggregation index. The unrecognized URL can specify a content delivery network (CDN). Also, the attribution is based on inspection of subject alternative names (SANs) identified in a certificate used for establishing a secure connection with the web server.

For family roll-up, a statistic that measures data received from or attributed to family members is rolled up to a family root of a roll-up family in the aggregation index.

The method can further include reporting or persisting the labelled data volume statistics for use in a further process and aggregating the labelled data volume statistics by family roots.

Each of the features discussed in this particular implementation section for the system implementation apply equally to this method implementation. As indicated above, all the system features are not repeated here and should be considered repeated by reference.

Other implementations may include a non-transitory computer readable storage medium storing instructions executable by a processor to perform the method described above. Yet another implementation may include a system including memory and one or more processors operable to execute instructions, stored in the memory, to perform the method described above.

Computer readable media (CRM) implementations of the technology disclosed include a non-transitory computer readable storage medium impressed with computer program instructions, when executed on a processor, implement the method described above.

Each of the features discussed in this particular implementation section for the system implementation apply equally to the CRM implementation. As indicated above, all the system features are not repeated here and should be considered repeated by reference.

The technology disclosed, and particularly the aggregation index 210 and the suite list 212, can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation, or an HBase™ or DynamoDB™ compatible non-relational database implementation. In addition, the technology disclosed can be implemented using different programming models like MapReduce™, bulk synchronous programming, MPI primitives, etc., or different scalable batch and stream management systems like Amazon Web Services (AWS)™, including Amazon Elasticsearch Service™ and Amazon Kinesis™, Apache Storm™, Apache Spark™, Apache Kafka™, Apache Flink™, Truviso™, IBM Info-Sphere™, Borealis™, and Yahoo! S4™.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A method of aggregate network traffic monitoring, the method including:
    monitoring, using a proxy, network traffic between an organization network and an external network and collecting data volume statistics for interactions between endpoints inside the organization network with data sources outside the organization network;
    labelling the data volume statistics for aggregation by attribution and family roll-up in an aggregation index, wherein:
        for attribution, a statistic that measures data received from a web server, specified by an unrecognized unified resource locator (URL) not found in the aggregation index, is attributed to a family member of a roll-up family based on inspection of subject alternative names (SANs) identified in a certificate used for establishing a secure connection with the web server; and
        for family roll-up, a statistic that measures data received from or attributed to family members is rolled up to a family root of a roll-up family;
    reporting or persisting the labelled data volume statistics for use in a further process; and
    aggregating the labelled data volume statistics by family roots.

2. The method of claim 1, wherein the unrecognized URL specifies a content delivery network (CDN).

3. The method of claim 1, wherein the aggregation index stores URLs, domain names, and subdomain names that represent a common data source as family members of a roll-up family.

4. The method of claim 1, further including the proxy populating the aggregation index by:
    inspecting a certificate accompanying a received URL for SANs; and
    attributing the URL and the SANs as new family members of an existing roll-up family or starting family members of a new roll-up family.

5. The method of claim 1, further including a web crawler periodically populating the aggregation index by:
    mining certificates accompanying URLs of most visited websites for SANs; and
    attributing the URLs and the SANs as new family members of existing roll-up families or starting family members of new roll-up families.

6. The method of claim 1, further including the proxy:
    comparing at least a substring of a received URL to entries in the aggregation index and classifying the URL as attributed or unattributed;
    if the URL is previously attributed to a roll-up family as a family member, attributing a statistic that measures data received from the URL to the roll-up family; and
    if the URL is unattributed and not found in the aggregation index, comparing at least a substring of one or more SANs of the URL to entries in the aggregation index and classifying the SANs as attributed or unattributed.

7. The method of claim 6, further including, if at least one SAN of the URL is previously attributed to a roll-up family as a family member, attributing a statistic that measures data received from the URL to the roll-up family and adding the URL to the roll-up family.

8. The method of claim 6, further including, if the SANs are unattributed and not found in the aggregation index, creating a new roll-up family based on the URL and the SANs.

9. The method of claim 1, wherein family members of a roll-up family share a common designator.

10. The method of claim 9, wherein the common designator is a domain name.

11. The method of claim 9, wherein the common designator is a subdomain name.

12. The method of claim 1, further including the proxy:
receiving an unrecognized URL with SANs, including non-exclusive SANs;
comparing at least a substring of the URL to entries in a suite list and classifying the URL as representing a suite common source;
attributing the URL and the SANs as family members of a roll-up family in the aggregation index and attributing a statistic that measures data received from the URL to the roll-up family; and
storing an indication requiring supplemental inspection of the SANs and the statistic.

13. The method of claim 12, wherein the supplemental inspection is supervised by an administrator.

14. The method of claim 1, further including the proxy:
receiving an unrecognized URL with SANs, including non-exclusive SANs;
using deep inspection to determine a true roll-up family for the URL in the aggregation index;
attributing, to the true roll-up family, SANs that correlate to at least one family member of the true roll-up family and attributing a statistic that measures data received from the URL to the true roll-up family; and
attributing to other roll-up families SANs that do not correlate to any family members of the true roll-up family, without statistic attribution.

15. The method of claim 1, wherein aggregated labelled data volume statistics by a family root aggregate data across countries from a data source with distinct URLs.

16. The method of claim 15, further including, in response to a query, causing display of the statistics to identify bandwidth consumption by the data source across the countries.

17. The method of claim 1, wherein the aggregated labelled data volume statistics by family roots aggregate data from multiple data sources that can be pooled via a private circuit data connection.

18. The method of claim 17, further including, in response to a query, causing display of the statistics to identify potential pooled data flow over the private circuit data connection.

19. A system including one or more processors coupled to memory, the memory loaded with computer instructions for aggregate network traffic monitoring, the instructions, when executed on the processors, implement actions comprising:
monitoring, using a proxy, network traffic between an organization network and an external network and collecting data volume statistics for interactions between endpoints inside the organization network with data sources outside the organization network;
labelling the data volume statistics for aggregation by attribution and family roll-up in an aggregation index, wherein:
for attribution, a statistic that measures data received from a web server, specified by an unrecognized unified resource locator (URL) not found in the aggregation index, is attributed to a family member of a roll-up family based on inspection of subject alternative names (SANs) identified in a certificate used for establishing a secure connection with the web server; and
for family roll-up, a statistic that measures data received from or attributed to family members is rolled up to a family root of a roll-up family;
reporting or persisting the labelled data volume statistics for use in a further process; and
aggregating the labelled data volume statistics by family roots.

20. A non-transitory computer readable storage medium impressed with computer program instructions for aggregate network traffic monitoring, the instructions, when executed on a processor, implement a method comprising:
monitoring, using a proxy, network traffic between an organization network and an external network and collecting data volume statistics for interactions between endpoints inside the organization network with data sources outside the organization network;
labelling the data volume statistics for aggregation by attribution and family roll-up in an aggregation index, wherein:
for attribution, a statistic that measures data received from a web server, specified by an unrecognized unified resource locator (URL) not found in the aggregation index, is attributed to a family member of a roll-up family based on inspection of subject alternative names (SANs) identified in a certificate used for establishing a secure connection with the web server; and
for family roll-up, a statistic that measures data received from or attributed to family members is rolled up to a family root of a roll-up family;
reporting or persisting the labelled data volume statistics for use in a further process; and
aggregating the labelled data volume statistics by family roots.

* * * * *